US012340284B2

(12) United States Patent
Mizoguchi

(10) Patent No.: US 12,340,284 B2
(45) Date of Patent: Jun. 24, 2025

(54) TIME-SERIES DATA PROCESSING METHOD

(71) Applicant: NEC Corporation, Tokyo (JP)

(72) Inventor: Takehiko Mizoguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 965 days.

(21) Appl. No.: 17/430,082

(22) PCT Filed: Feb. 15, 2019

(86) PCT No.: PCT/JP2019/005617
§ 371 (c)(1),
(2) Date: Aug. 11, 2021

(87) PCT Pub. No.: WO2020/166072
PCT Pub. Date: Aug. 20, 2020

(65) Prior Publication Data
US 2022/0138624 A1    May 5, 2022

(51) Int. Cl.
*G06N 20/00* (2019.01)
*G06F 18/21* (2023.01)
*G06F 18/213* (2023.01)

(52) U.S. Cl.
CPC .......... *G06N 20/00* (2019.01); *G06F 18/213* (2023.01); *G06F 18/2163* (2023.01)

(58) Field of Classification Search
CPC .............. G06F 18/213; G06F 18/2163; G06F 2218/16; G06N 20/00
USPC ......................................................... 702/79
See application file for complete search history.

(56) References Cited

U.S. PATENT DOCUMENTS

| | | | |
|---|---|---|---|
| 2012/0185737 | A1 | 7/2012 | Ishiou |
| 2015/0213790 | A1* | 7/2015 | Oh ............................ H04S 3/02 381/23 |
| 2016/0196175 | A1 | 7/2016 | Kasahara et al. |
| 2017/0286841 | A1 | 10/2017 | Yoshinaga et al. |
| 2017/0329660 | A1 | 11/2017 | Salunke et al. |
| 2018/0246958 | A1* | 8/2018 | Serita ...................... G06F 16/00 |

(Continued)

FOREIGN PATENT DOCUMENTS

| | | |
|---|---|---|
| JP | 2015-528925 A | 10/2015 |
| JP | 2017-037496 A | 2/2017 |
| WO | 2011/155621 A1 | 12/2011 |

(Continued)

OTHER PUBLICATIONS

English translation JP2015528925A, Oh, "Audio Signal Processing Apparatus And Method", date published Oct. 1, 2015 (Year: 2015).*

(Continued)

*Primary Examiner* — John H Le
(74) *Attorney, Agent, or Firm* — Sughrue Mion, PLLC

(57) ABSTRACT

An information processing device 100 of the present invention includes an analysis unit 121 and an encoding unit 122. The analysis unit 121 extracts a partial time-series data set obtained by dividing a time-series data set that is a set of time-series data including a plurality of elements at given time intervals, and calculates correlation data representing a correlation between elements of time-series data included in the partial time-series data set. The encoding unit 122 generates coded data based on the time-series data of the partial time-series data set and the correlation data.

9 Claims, 19 Drawing Sheets

(56) References Cited

U.S. PATENT DOCUMENTS

2018/0322394 A1\* 11/2018 Nguyen ................. G06N 20/00
2020/0067969 A1\* 2/2020 Abbaszadeh ............ G06N 5/04

FOREIGN PATENT DOCUMENTS

| WO | 2015/033603 A1 | 3/2015 |
| WO | 2016/035338 A1 | 3/2016 |
| WO | 2017/168524 A1 | 10/2017 |

OTHER PUBLICATIONS

International Search Report for PCT Application No. PCT/JP2019/005617, mailed on May 21, 2019.
Japanese Office Action for JP Application No. 2020-572047 mailed on Sep. 13, 2022 with English Translation.

\* cited by examiner

TIME-SERIES DATA PROCESSING METHOD

This application is a National Stage Entry of PCT/JP2019/005617 filed on Feb. 15, 2019, the contents of all of which are incorporated herein by reference, in their entirety.

TECHNICAL FIELD

The present invention relates to a time-series data processing method, a time-series data processing device, and a program.

BACKGROUND ART

In plants such as production facilities and processing facilities, time-series data that is measurement values from various sensors is analyzed, and occurrence of an abnormal state is detected and output. For example, Patent Literature 1 describes generating a model representing correlations of a plurality of pieces of time-series data, obtaining whether or not newly observed time-series data maintains the correlations represented by the model, whereby detecting an abnormal state.

Further, Patent Literature 2 describes specifying a failure that has occurred in a system from a plurality of performance values of the system. Specifically, first, information of a correlation in which correlation destruction is detected at the time of occurrence of a failure, among the correlations of a plurality of performance values of the system, is stored. Then, the common degree between the correlation of such correlation destruction and the correlation in which correlation destruction of the input time-series data is detected is calculated, whereby a failure is specified.
Patent Literature 1: WO 2016/035338 A

SUMMARY

However, the methods described above causes a problem that it is impossible to specify the state of a monitoring object at a higher speed with higher accuracy. For example, in Patent Literature 2, information of a correlation of correlation destruction in which a failure has occurred is stored. However, since the time-series behavior of the performance values is not considered, it is impossible to specify the state with higher accuracy. That is, in the case where correlation destruction patterns are similar although the states of the monitoring object are different, it is impossible to accurately distinguish different states and specify them. Moreover, in the case where the configuration of a monitoring object such as a system is complex, the number of units of data to be measured becomes enormous, and accordingly the amount of information specifying the correlation destruction also becomes enormous. Therefore, it takes time to search for a pattern of correlation destruction corresponding to the measured data.

Therefore, an object of the present invention is to solve the problem described above, that is, a problem that it is impossible to specify the state of a monitoring object at a high speed with accuracy.

A time-series data processing method, according to one aspect of the present invention, is configured to include extracting a partial time-series data set obtained by dividing a time-series data set at a given time interval, the time-series data set being a set of time-series data including a plurality of elements, calculating correlation data representing a correlation between elements of the time-series data included in the partial time-series data set, and generating coded data based on the time-series data of the partial time-series data set and the correlation data.

Further, a time-series data processing method, according to one aspect of the present invention, is configured to include extracting a plurality of partial time-series data sets obtained by dividing a time-series data set at a given time interval, the time-series data set being a set of time-series data including a plurality of elements, from each of the plurality of partial time-series data sets, calculating correlation data representing a correlation between elements of the time-series data included in the partial time-series data set, and according to a difference in the time-series data and a difference in the correlation data between the partial time-series data sets that are different from each other, generating a model that learned to generate coded data based on the time-series data of the partial time-series data set and the correlation data.

Further, a time-series data processing method, according to one aspect of the present invention, is configured to include receiving input of time-series data of a partial time-series data set obtained by dividing a time-series data set at a given time interval, the partial time-series data set being a set of time-series data including a plurality of elements, and correlation data between elements of the time-series data, and storing information based on the time-series data and the correlation data in a storage unit, searching the storage unit for information corresponding to the time-series data of the partial time-series data set in the time-series data set that is newly input and the correlation data; and outputting a search result.

A program, according to one aspect of the present invention, is configured to cause an information processing device to perform processing of extracting a partial time-series data set obtained by dividing a time-series data set at a given time interval, the time-series data set being a set of time-series data including a plurality of elements, calculating correlation data representing a correlation between elements of the time-series data included in the partial time-series data set, and generating coded data based on the time-series data of the partial time-series data set and the correlation data.

Further, a program, according to one aspect of the present invention, is configured to cause an information processing device to perform processing of:

extracting a plurality of partial time-series data sets obtained by dividing a time-series data set at a given time interval, the time-series data set being a set of time-series data including a plurality of elements;

from each of the plurality of partial time-series data sets, calculating correlation data representing a correlation between elements of the time-series data included in the partial time-series data set; and according to a difference in the time-series data and a difference in the correlation data between the partial time-series data sets that are different from each other, generating a model that learned to generate coded data based on the time-series data of the partial time-series data set and the correlation data.

Further, a program, according to one aspect of the present invention, is configured to cause an information processing device to perform processing of receiving input of time-series data of a partial time-series data set obtained by dividing a time-series data set at a given time interval, the partial time-series data set being a set of time-series data including a plurality of elements, and correlation data between elements of the time-series data, and storing information based on the time-series data and the correlation data in a storage unit;

searching the storage unit for information corresponding to the time-series data of the partial time-series data set in the time-series data set that is newly input and the correlation data; and outputting a search result.

A time-series data processing device, according to one aspect of the present invention, is configured to include an analysis unit that extracts a partial time-series data set obtained by dividing a time-series data set at a given time interval, the time-series data set being a set of time-series data including a plurality of elements, and calculates correlation data representing a correlation between elements of the time-series data included in the partial time-series data set; and an encoding unit that generates coded data based on the time-series data of the partial time-series data set and the correlation data.

Further, a time-series data processing device, according to one aspect of the present invention, is configured to include an analysis unit that extracts a plurality of partial time-series data sets obtained by dividing a time-series data set at a given time interval, the time-series data set being a set of time-series data including a plurality of elements, and from each of the plurality of partial time-series data sets, calculates correlation data representing a correlation between elements of the time-series data included in the partial time-series data set; and a learning unit that, according to a difference in the time-series data and a difference in the correlation data between the partial time-series data sets that are different from each other, generates a model that learned to generate coded data based on the time-series data of the partial time-series data set and the correlation data.

Further, a time-series data processing device, according to one aspect of the present invention, is configured to include an input unit that receives input of time-series data of a partial time-series data set obtained by dividing a time-series data set at a given time interval, the partial time-series data set being a set of time-series data including a plurality of elements, and correlation data between elements of the time-series data, and stores information based on the time-series data and the correlation data in a storage unit; and a search unit that searches the storage unit for information corresponding to the time-series data of the partial time-series data set in the time-series data set that is newly input and the correlation data, and outputs a search result.

Since the present invention is configured as described above, it is possible to specify the state of a monitoring object at a high speed with accuracy.

EXEMPLARY EMBODIMENTS

First Exemplary Embodiment

Figure 1:
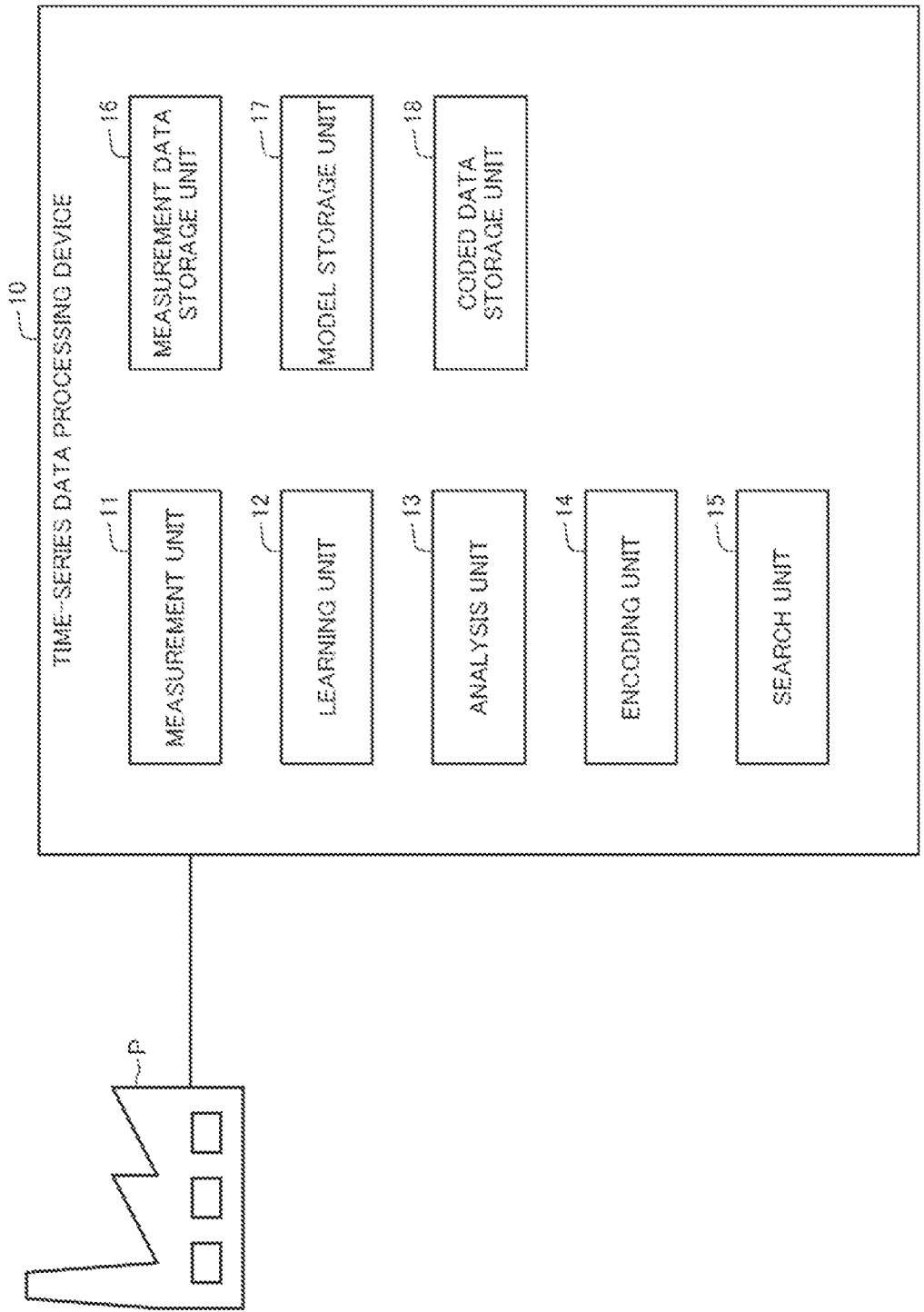
FIG. 1 is a block diagram illustrating a configuration of a time-series data processing device according to a first exemplary embodiment of the present invention.
Figure 2:
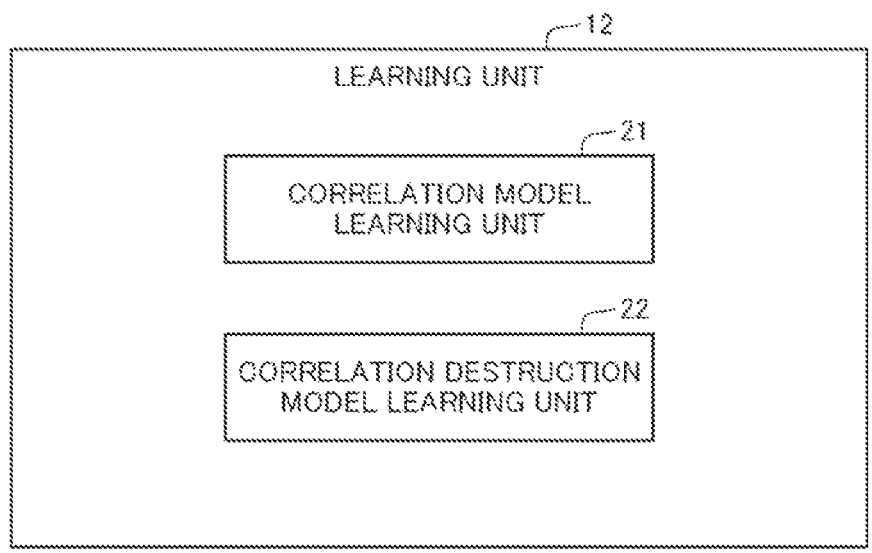
FIG. 2 is a block diagram illustrating a configuration of the learning unit disclosed in FIG. 1.
Figure 3:
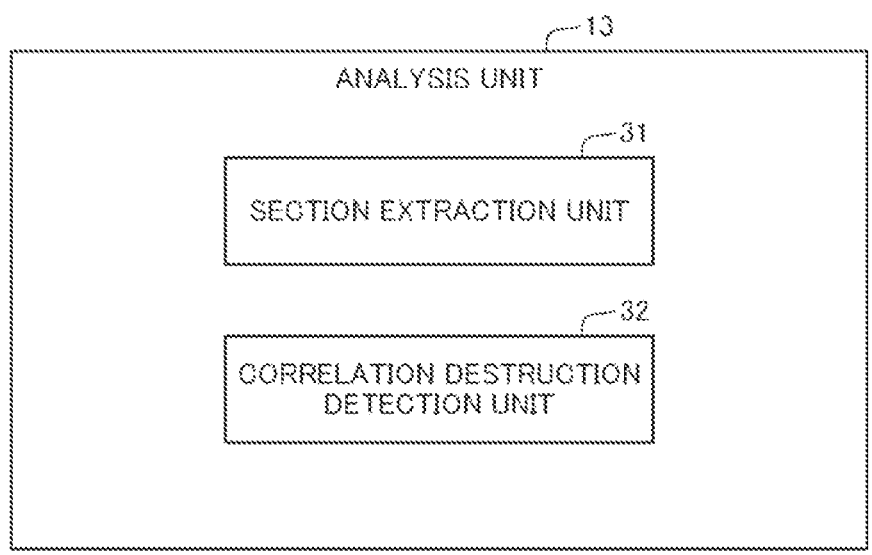
FIG. 3 is a block diagram illustrating a configuration of the analysis unit disclosed in FIG. 1.

A first exemplary embodiment of the present invention will be described with reference to FIGS. 1 to 12. FIGS. 1 to 3 are diagrams for explaining a configuration of a time-series data processing device, and FIGS. 4 to 12 are drawings for explaining the processing operation of the time-series data processing device.

[Configuration]

A time-series data processing device 10 of the present invention is connected to a monitoring object P (object) such as a plant. Then, the time-series data processing device 10 is used to acquire and analyze measurement values of the elements of the monitoring object P, and monitor the state of the monitoring object P on the basis of the analysis result. For example, the monitoring object P is a plant such as a production facility or a processing facility, and the measurement values of the elements include a plurality of types of information such as temperature, pressure, flow rate, power consumption value, the amount of material supply, and the remaining amount, in the plant. The state of the monitoring object P to be monitored is an abnormal state of the monitoring object P, and the time-series data processing device 10 is configured to specify the details of the abnormal state.

However, the monitoring object P in the present invention is not limited to a plant, and may be anything such as equipment including an information processing system. For example, in the case where the monitoring object is an information processing system, it is possible to measure utilization of the central processing unit (CPU), memory utilization, disk access frequency, the number of input/output packets, power consumption value, and the like of each information processing device constituting the information processing system, as measurement values of the elements, analyze such measurement values to monitor the state of the information processing system, to thereby specify the abnormal state.

The time-series data processing device 10 is configured of one or a plurality of information processing devices each having an arithmetic unit and a storage unit. Then, as illustrated in FIG. 1, the time-series data processing device 10 includes a measurement unit 11, a learning unit 12, an analysis unit 13, and an encoding unit 14, and a search unit 15 that are constructed by execution of a program by the arithmetic unit. The time-series data processing device 10 also includes a measurement data storage unit 16, a model storage unit 17, and a coded data storage unit 18 that are formed in a storage device. Hereinafter, each configuration will be described in detail.

The measurement unit 11 acquires measurement values of each element, measured by each type of sensor provided to the monitoring object P at certain time intervals, as time-series data, and stores them in the measurement data storage unit 16. Here, since there are a plurality of types of elements to be measured, the measurement unit 11 acquires a time-series data set that is a set of time-series data of a plurality of elements as denoted by a reference sign D in FIG. 4. Note that acquisition and storing of a time-series data set by the measurement unit 11 are performed regularly. The acquired time-series data set is used at the time of generating a correlation model representing the normal state of the monitoring object P, generating a correlation destruction model for generating coded data in an abnormal state of the monitoring object P, generating coded data in the abnormal state of the monitoring object P, and monitoring the state of the monitoring object P, as described below.

The learning unit 12 inputs therein a time-series data set measured from the monitoring object P, and generates various types of models. As illustrated in FIG. 2, the learning unit 12 includes a correlation model learning unit 21 and a correlation destruction model learning unit 22, and performs a process of generating a correlation model representing a normal state of the monitoring object P and a process of generating a correlation destruction model for generating coded data in an abnormal state of the monitoring object P, as described below.

Figure 4:
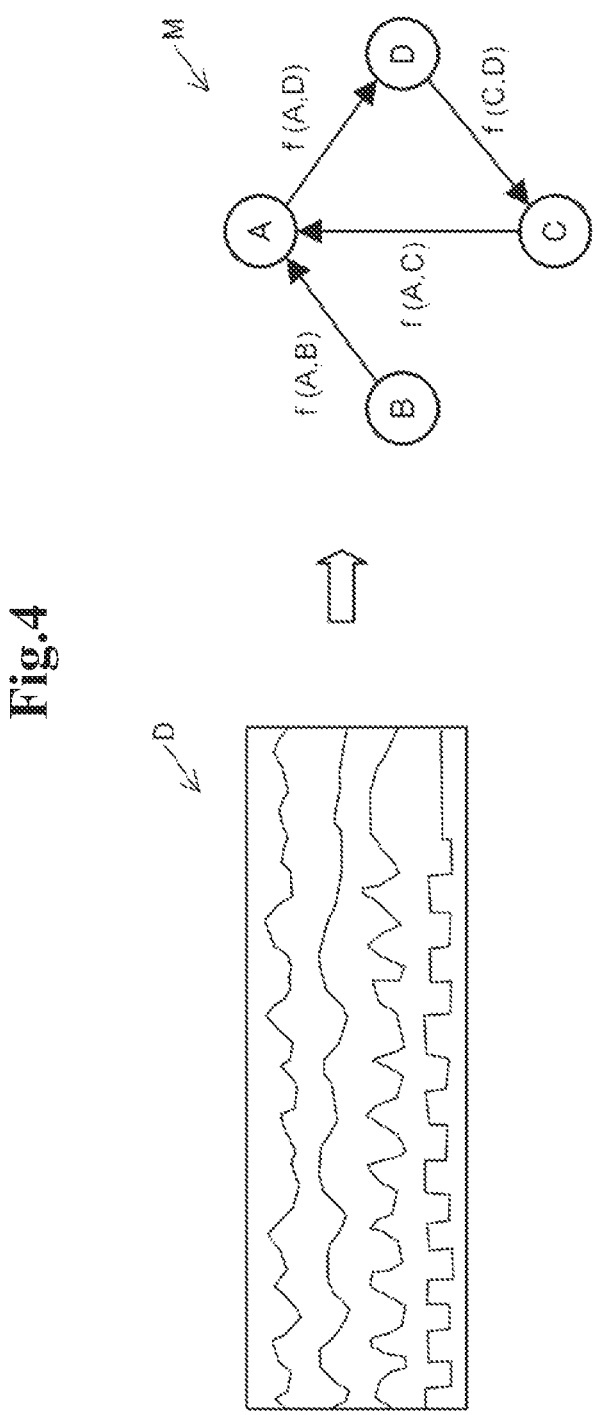
FIG. 4 illustrates a state of processing time-series data by the time-series data processing device disclosed in FIG. 1.

As illustrated in FIG. 4, the correlation model learning unit 21 receives, from the measurement data storage unit 15, learning data that is the time-series data set D measured when the monitoring object P is determined to be in a normal state and inputs it therein, and generates a correlation model M. For example, as illustrated in FIG. 4, the correlation model M includes a correlation function (for example, f(A, B) or the like) representing a correlation of measurement values of any two elements among a plurality of elements (for example, A, B, C, and D). A correlation function is a function that predicts an output value of the other element with respect to an input value of one element of any two elements. Here, a weight is set to each correlation function between elements included in the correlation model. The correlation model learning unit 21 generates a set of correlation functions between a plurality of elements as described above as the correlation model M, and stores it in the model storage unit 17.

The correlation destruction model learning unit 22 performs learning on the basis of a time-series data set measured when the monitoring object P is determined to be in an abnormal state and the content of the abnormal state, and generates a correlation destruction model that is a model for generating coded data serving as a feature amount based thereon. The correlation destruction model learning unit 22 will be described later.

The analysis unit 13 acquires a time-series data set measured after the generation of the correlation model described above, and analyzes the time-series data set. The analysis unit 13 includes a section extraction unit 31 and a correlation destruction detection unit 32 as illustrated in FIG. 3.

Figure 5:
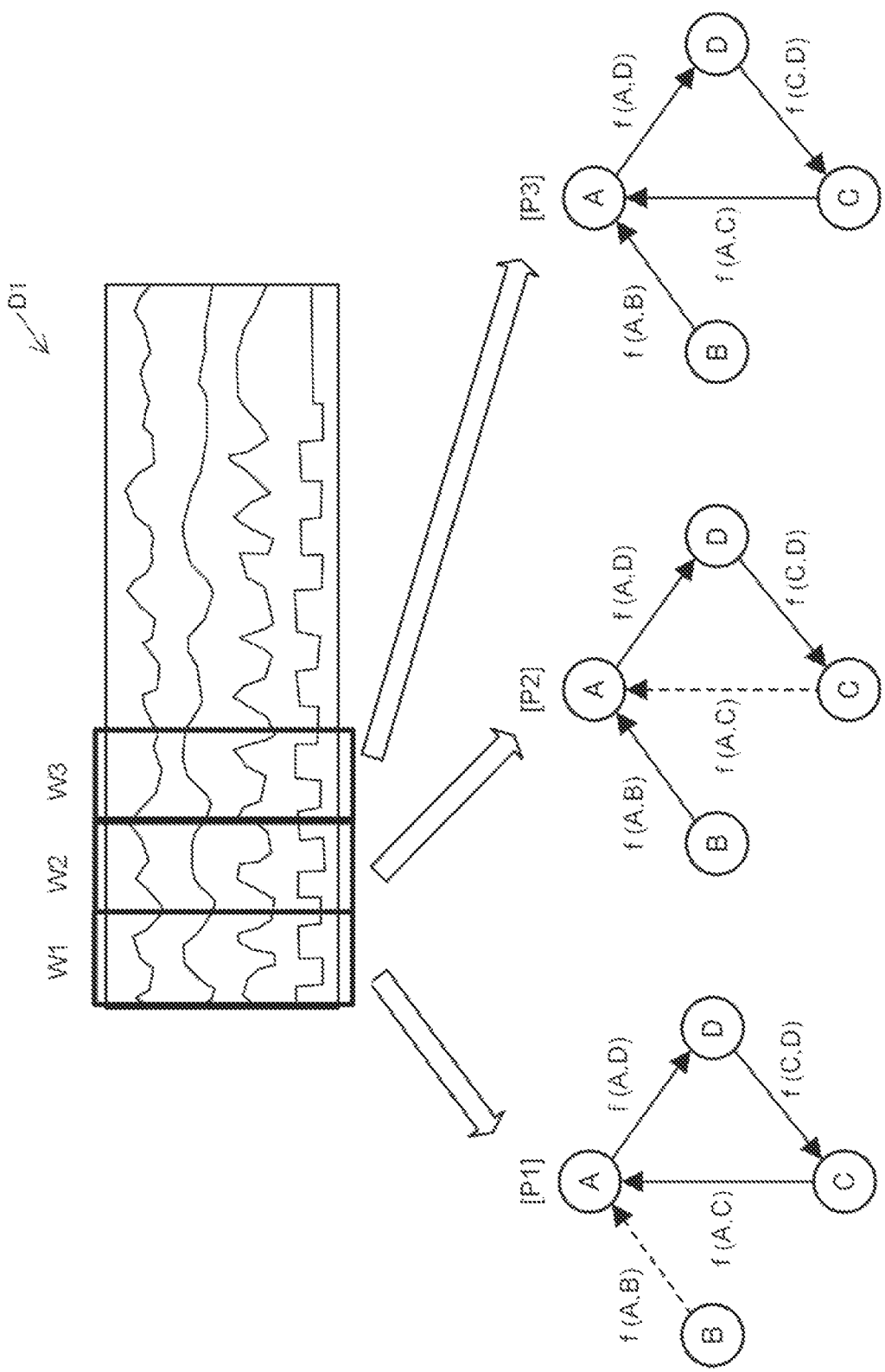
FIG. 5 illustrates a state of processing time-series data by the time-series data processing device disclosed in FIG. 1.

The section extraction unit 31 inputs therein a time-series data set measured from the monitoring object P, and extracts a partial time-series data set configured of a section obtained by dividing the time-series data set at given time intervals. For example, as illustrated in FIG. 5, the section extraction unit 31 extracts, from the measured time-series data set D, a partial time-series data sets obtained by dividing the time-series data set D at the same time interval, as denoted by reference signs W1, W2, and W3. Note that each of the partial time-series data sets W1, W2, and W3 is not limited to be set to sections divided continuously in a time-series manner. It is also possible that a space exists between sections, or that sections may overlap with each other.

The correlation destruction detection unit 32 compares each of the partial time-series data sets W1, W2, and W3 extracted as described above with the correlation model M stored in the model storage unit 17, and checks whether or not correlation destruction has occurred in each of the partial time-series data sets W1, W2, and W3. That is, for each of the partial time-series data sets, the correlation destruction detection unit 32 calculates correlation data representing the correlation between elements of the time-series data, compares it with the correlation model M, and checks whether or not correlation destruction has occurred on the basis of a difference from the correlation model M. Specifically, for example, to the correlation function between two given elements included in the correlation model M, the correlation data calculation unit 32 inputs a measured input value of one element to predict an output value of the other element, and obtains a difference between the prediction value and an actual measurement value. Here, when the difference is a predetermined value or larger, the correlation between such two elements is detected to be collapsed, that is, detected as correlation destruction. At that time, the correlation data calculation unit 32 may check differences in the correlation functions between a plurality of elements and the states of correlation destruction, and in consideration of the magnitude of the differences, the weight of each correlation, and the number of correlations in correlation destruction comprehensively, determine whether or not correlation destruction has occurred for each of the partial time-series data sets W1, W2, and W3.

FIG. 5 illustrates an example in which pieces of correlation data P1, P2, and P3 are generated from pieces of time-series data of the partial time-series data sets W1, W2, and W3 respectively, by the correlation destruction detection unit 32. In the correlation data P1, P2, and P3 illustrated in this figure, it is shown that a correlation between elements indicated by a dotted line is destructed, so that correlation destruction has occurred in the correlation data P1 and P2 in the partial time-series data sets W1 and W2. Then, the correlation destruction detection unit 32 sends the partial time-series data sets determined that the correlation destruction has occurred and the correlation data thereof, to the correlation destruction model learning unit 22 of the learning unit 12 and the encoding unit 14. Specifically, in the case of generating a correlation destruction model for generating coded data in an abnormal state of the monitoring object P, the correlation destruction detection unit 32 sends them to the correlation destruction model learning unit 22 of the learning unit 12, while in the case of generating coded data in an abnormal state of the monitoring object P and monitoring the state of the monitoring object P, it sends them to the encoding unit 14.

Figure 6:
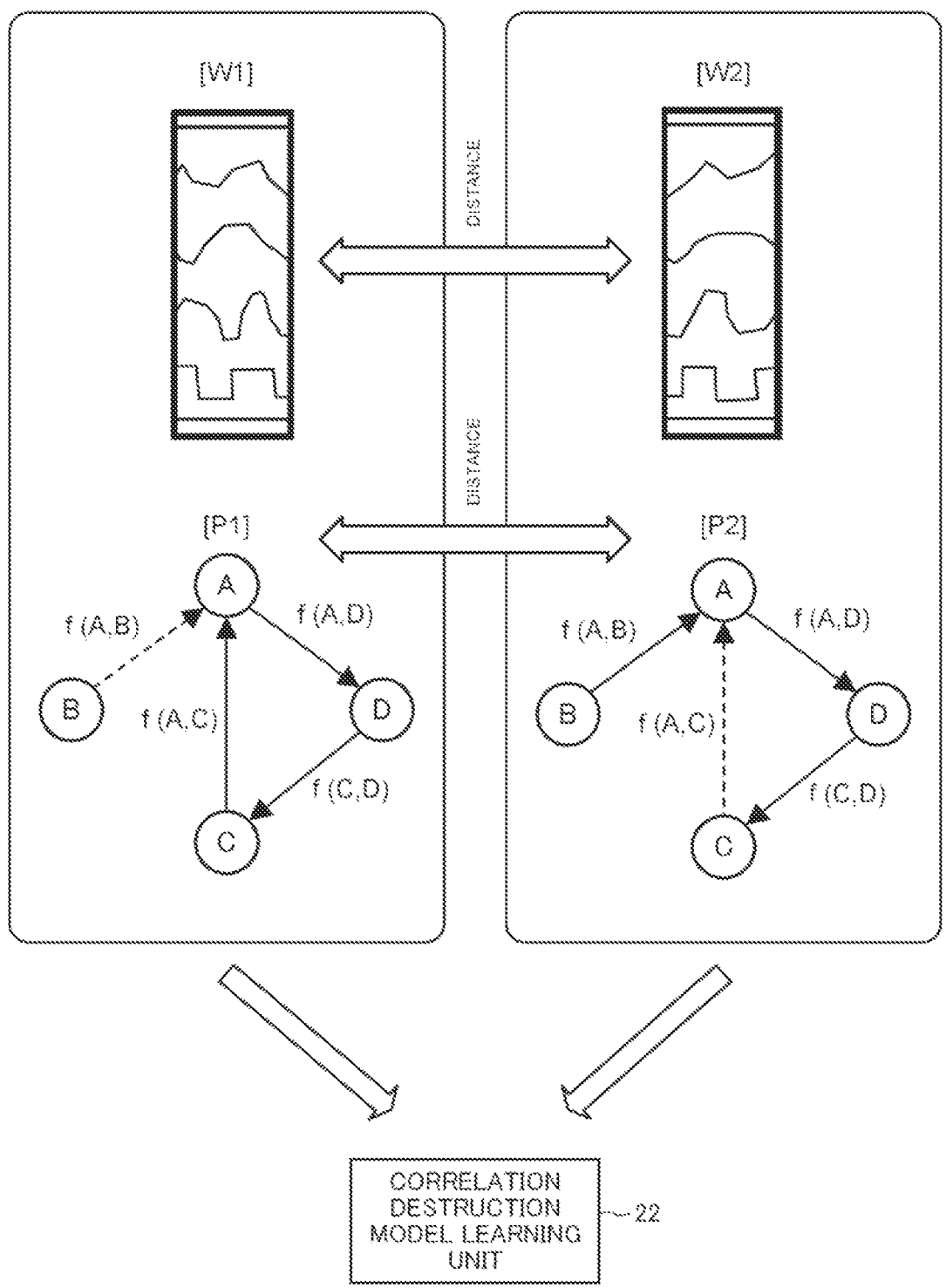
FIG. 6 illustrates a state of processing time-series data by the time-series data processing device disclosed in FIG. 1.

Here, the correlation destruction model learning unit 22 will be described again. The correlation destruction model learning unit 22 generates a correlation destruction model on the basis of a partial time-series data set and the correlation data thereof received from the correlation destruction detection unit 32. Specifically, as illustrated in FIG. 6, with use of partial time-series data sets W1 and W2 of two different sections, the correlation destruction model learning unit 22 first calculates a distance (difference) between the pieces of time-series data included in the partial time-series data sets W1 and W2 and a distance (difference) between the pieces of correlation data P1 and P2 thereof. For example, the correlation destruction model learning unit 22 first converts each of the time-series data and the correlation data into coded data such as a binary vector. Here, the correlation destruction model learning unit 22 converts each piece of the time-series data and the correlation data into a real number vector, and converts the real number vector into a binary vector. Note that a real number vector means a vector in which the value of each dimension takes a real number. Then, the correlation destruction model learning unit 22 calculates a Euclidean distance between the binary vectors of each type to thereby calculate the distance between the pieces of time-series data and the distance between the pieces of correlation data. In this case, the distance is calculated such that it takes a small value when the two binary vectors are close, while the distance takes a large value when they are not close. However, the correlation destruction model learning unit 22 may calculate the distance between the pieces of time-series data included in the partial time-series data sets W1 and W2 and the distance between the pieces of correlation data P1 and P2 thereof, by another method without being limited to the Euclidean distance.

Then, the correlation destruction model learning unit 22 performs learning using the partial time-series data sets W1 and W2, the correlation data P1 and P2, and the distances thereof, and generates a correlation destruction model. The correlation destruction model generated here is a model in which the partial time-series data and the correlation data are input therein and that serves as a reference for generating coded data representing the features thereof. In particular, the correlation destruction model learning unit 22 generates a model that generates similar coded data as the distance between the pieces of partial time-series data and the distance between the pieces of correlation data are closer, that is, as the difference between the pieces of partial time-series data and the difference between the pieces of correlation data are smaller. Therefore, the correlation destruction model is a model that can generate identical pieces of coded data from the pieces of time-series data and the pieces of correlation data measured in the same event. Note that the correlation destruction model learning unit 22 inputs therein and learns a large number of sets of two partial time-series data sets in which correlation destruction has occurred and the correlation data thereof to thereby generate a correlation destruction model for generating coded data representing the features of the partial time-series data and the correlation data. Here, in the example of FIG. 6, the correlation destruction model learning unit 22 performs learning using a pair of the partial time-series data sets W1 and W2 that continue in a time-series manner. However, any pair of partial time-series data sets may be used such as one having a space between the sections.

Figure 7:
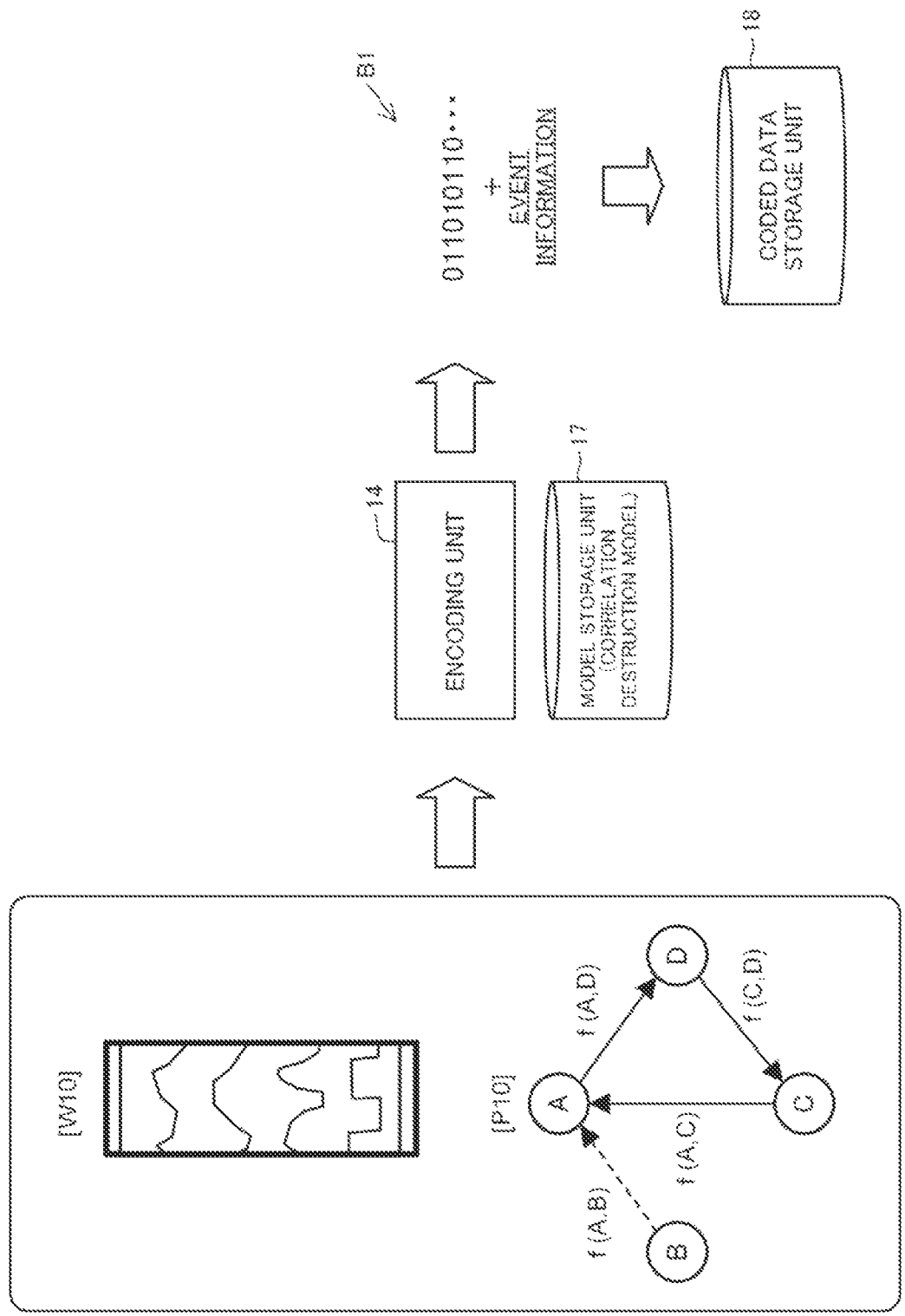
FIG. 7 illustrates a state of processing time-series data by the time-series data processing device disclosed in FIG. 1.

The encoding unit 14 inputs therein the partial time-series data set and the correlation data thereof received from the correlation destruction detection unit 32, and generates coded data representing the features of the partial time-series data set and the correlation data by using the correlation destruction model. That is, the encoding unit 14 generates coded data that is information based on the partial time-series data sets and the correlation data input therein. Specifically, the encoding unit 14 first inputs therein a partial time-series data set W10 and correlation data P10 thereof. The partial time-series data set W10 is a data set that consists of one section, and is measured in a situation of generating coded data in an abnormal state of the monitoring object P after a correlation destruction model has been generated as described above and is received from the correlation destruction detection unit 32, and correlation data P10 thereof. Then, as illustrated in FIG. 7, from the partial time-series data set W10 and the correlation data P10 thereof, the encoding unit 14 generates coded data B1 consisting of a binary vector with use of the correlation destruction model. The encoding unit 14 stores the generated coded data B1 in the coded data storage unit 32. Here, the encoding unit 14 stores, in the coded data storage unit 32, the generated coded data B1 in association with information of an event having occurred when measuring the time-series data set that is the source of generating the coded data B1. For example, event information includes information representing the content actually performed such as "maintenance", information about a person in charge of the event and the date/time of the event, and the like. The encoding unit 14 generates the coded data B1 with respect to a large number of partial time-series data sets W10 at different date/time and different situations to thereby be able to accumulate coded data B1 representing the features of the partial time-series data sets and the correlation data of every abnormal state.

Figure 8:
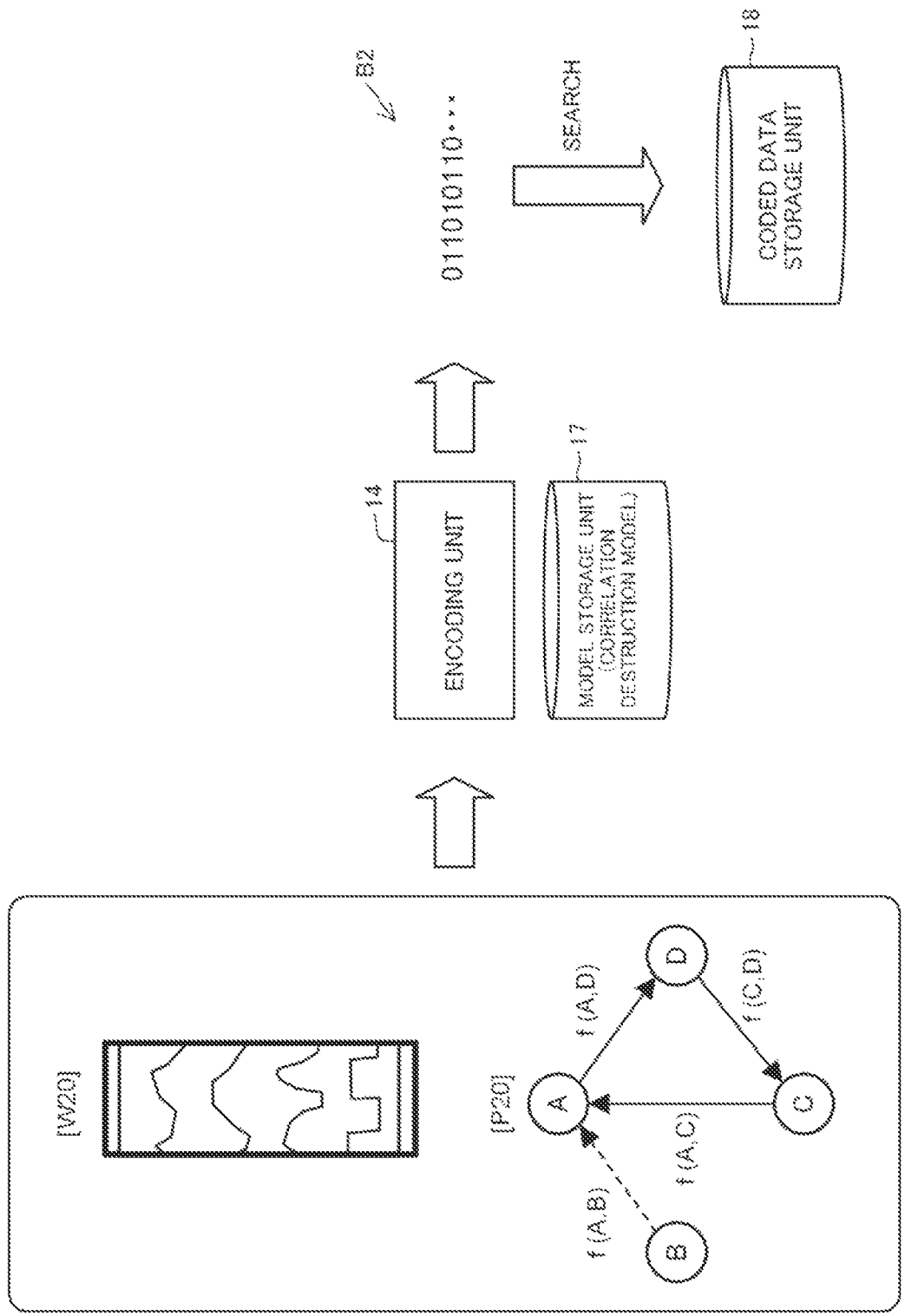
FIG. 8 illustrates a state of processing time-series data by the time-series data processing device disclosed in FIG. 1.
Figure 9:
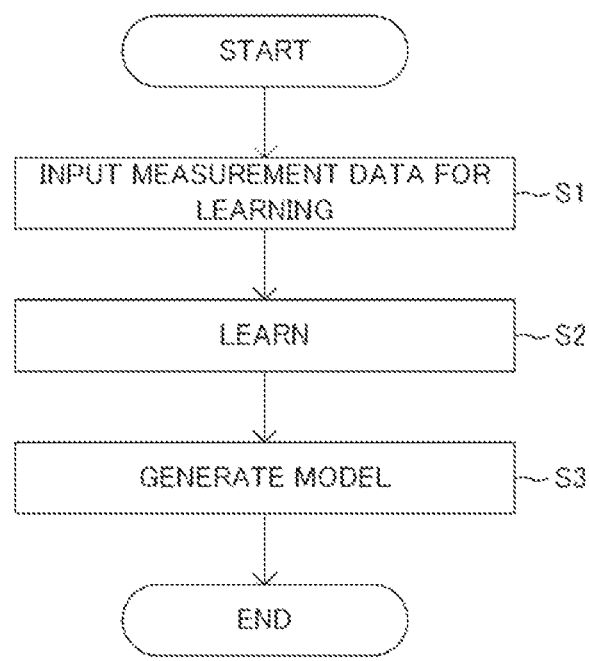
FIG. 9 is a flowchart illustrating an operation of the time-series data processing device disclosed in FIG. 1.

Further, with respect to the partial time-series data set W10 that consists of one section and is measured in a situation of monitoring the state of the monitoring object P after coded data in the abnormal state of the monitoring object P has been accumulated and is received from the correlation destruction detection unit 32 and the correlation data P10 thereof as described above, the encoding unit 14 generates coded data B2 as similar to the above description, as illustrated in FIG. 8. Then, the encoding unit 14 sends the coded data B2 to the search unit 15.

As illustrated in FIG. 8, in the situation of monitoring the state of the monitoring object P, the search unit 15 searches the coded data storage unit 18 for data identical to the newly generated coded data B2 sent from the encoding unit 14. That is, the search unit 15 searches the coded data storage unit 18 for data identical to the coded data that is information based on the newly input partial time-series data sets and the correlation data. Then, as a result of the search, when coded data identical to the newly generated coded data B2 exists in the coded data storage unit 18, the search unit 15 reads event information associated with the coded data stored in the coded data storage unit 18, and outputs the event information to the surveillant. That is, the search unit 15 specifies the event corresponding to the readout event information as an event having occurred when measuring the time-series data serving as the source of generating the newly generated coded data B2. Note that regarding the newly generated coded data B2, the search unit 15 may determine that it matches coded data having an allowable difference according to the preset reference, without limited to coded data that completely matches.

[Operation]

Next, operation of the time-series data processing device system 10 will be described with reference to the flowcharts of FIGS. 9 to 12. First, an operation of generating a correlation model representing a correlation between elements when the monitoring object P is in a normal state will be described with reference to the flowchart of FIG. 9.

As illustrated in FIG. 4, the time-series data processing device 10 reads, from the measurement data storage unit 15, data D for learning that is a time-series data set measured when the monitoring object P is determined to be in a normal state, and inputs it therein (step S1). Then, the time-series data processing device 10 learns the correlation between the elements from the input time-series data (step S2), and generates a correlation model M representing the correlation between the elements (step S3).

Figure 10:
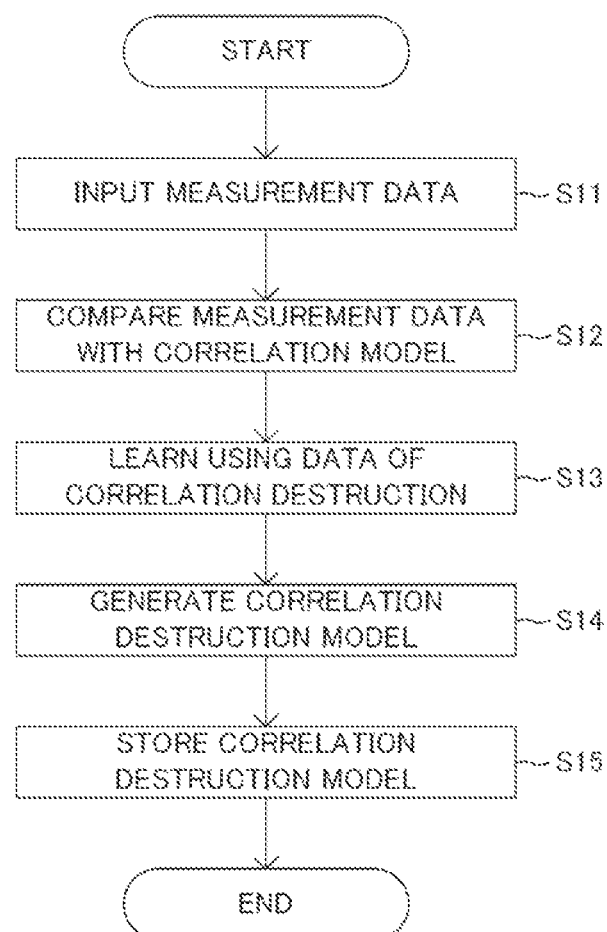
FIG. 10 is a flowchart illustrating an operation of the time-series data processing device disclosed in FIG. 1.

Next, with reference to the flowchart of FIG. 10, a process of generating a correlation destruction model for generating coded data in an abnormal state of the monitoring object P will be described. First, the time-series data processing device 10 inputs therein a time-series data set D1 newly measured from the monitoring object P and, as illustrated in FIG. 5, extracts the partial time-series data sets W1, W2, and W3 each configured of a section obtained by dividing the time-series data set D1 at given time intervals (step S11). Then, for the respective partial time-series data sets W1, W2, and W3, the time-series data processing device 10 calculates the pieces of correlation data P1, P2, and P3 each representing the correlation between the elements of each piece of time-series data, compares it with the correlation model M, and checks whether or not correlation destruction has occurred on the basis of a difference from the correlation model M (step S12).

Then, as illustrated in FIG. 6, with use of a pair of the partial time-series data sets W1 and W2 in which correlation destruction has occurred, the time-series data processing device 10 calculates a distance (difference) between the pieces of time-series data included in the partial time-series data sets W1 and W2, and a distance (difference) between the pieces of correlation data P1 and P2 thereof. Then, the time-series data processing device 10 performs learning with use of a plurality of pieces of data including the partial time-series data W1 and W2, the correlation data P1 and P2, and the distances thereof (step S13), and generates a correlation destruction model (step S14). At that time, the time-series data processing device 10 generates a correlation destruction model having learned to generate similar coded data as the distance between the pieces of partial time-series data and the distance between the pieces of correlation data are closer, that is, as the difference between the pieces of partial time-series data and the difference between the pieces of correlation data are smaller. Then, the time-series data processing device 10 stores the generated correlation destruction model in the model storage unit 17 (step S15).

Figure 11:
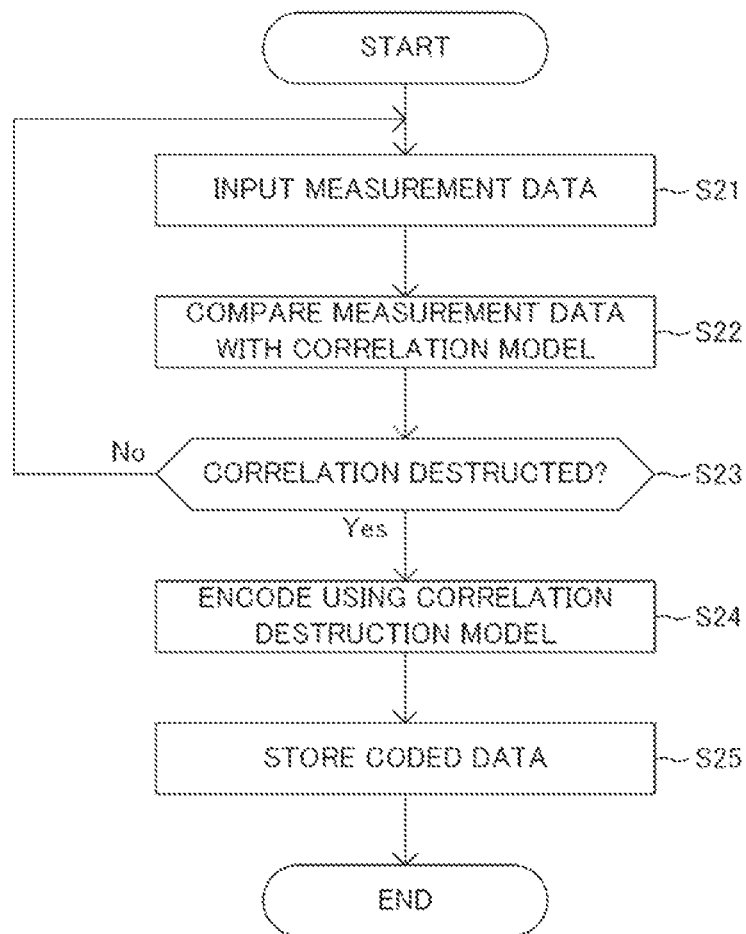
FIG. 11 is a flowchart illustrating an operation of the time-series data processing device disclosed in FIG. 1.

Next, with reference to the flowchart of FIG. 11, a process of generating coded data in an abnormal state of the monitoring object P will be described. First, the time-series data processing device 10 inputs therein a time-series data set that is newly measured thereafter from the monitoring object P and, as illustrated in FIG. 7, extracts one partial time-series data set W10 configured of a section obtained by dividing the time-series data set at given time intervals (step S21). Then, for the partial time-series data set W10, the time-series data processing device 10 calculates correlation data P10 representing the correlation between the elements of the time-series data, compares it with the correlation model M (step S22), and checks whether or not correlation destruction has occurred on the basis of a difference from the correlation model M (step S23).

Then, as illustrated in FIG. 7, with respect to the partial time-series data set W10 in which correlation destruction has occurred (Yes at step S23), the time-series data processing device 10 inputs the time-series data set W10 and the correlation data P10 in the encoding unit 14. Then, from the partial time-series data set W10 and the correlation data P10 thereof, the encoding unit 14 generates the coded data B1 consisting of a binary vector with use of the correlation destruction model stored in the model storage unit 17 (step S24). Then, the encoding unit 14 stores, in the coded data storage unit 32, the generated coded data B1 in association with information of the event having occurred when measuring the time-series data set that is the source of generating the coded data B1 (step S25). The time-series data processing device 10 generates the coded data B1 with respect to a large number of partial time-series data sets W10 and accumulates the coded data B1 representing the features of the partial time-series data sets and the correlation data of a large number of abnormal states.

Figure 12:
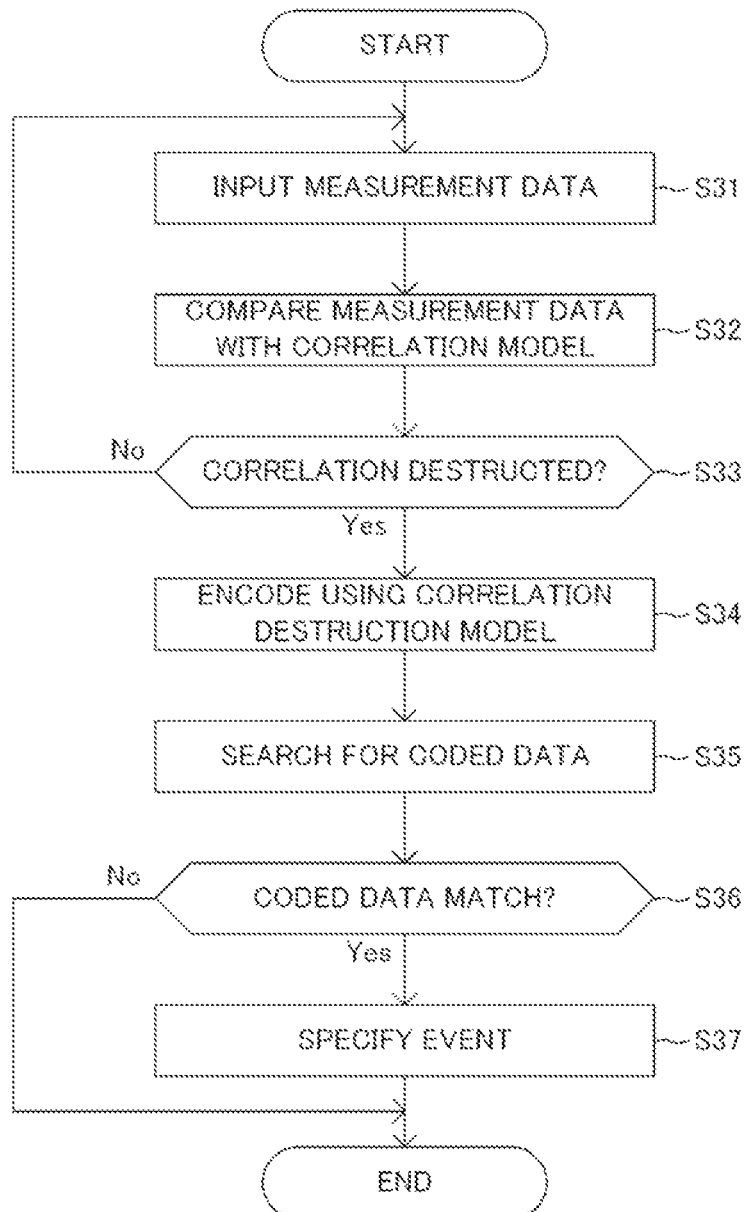
FIG. 12 is a flowchart illustrating an operation of the time-series data processing device disclosed in FIG. 1.

Next, a process of monitoring the state of the monitoring object P will be described with reference to the flowchart of FIG. 12. First, the time-series data processing device 10 inputs therein another time-series data set that is newly measured thereafter from the monitoring object P and, as illustrated in FIG. 8, extracts one partial time-series data set W20 configured of a section obtained by dividing the time-series data set at given time intervals (step S31). Then, for the partial time-series data set W20, the time-series data processing device 10 calculates correlation data P20 representing the correlation between the elements of the time-series data, compares it with the correlation model M (step S32), and checks whether or not correlation destruction has occurred on the basis of a difference from the correlation model M (step S33).

Then, as illustrated in FIG. 8, with respect to the partial time-series data set W20 in which correlation destruction has occurred (Yes at step S33), the time-series data processing device 10 inputs the time-series data set W20 and correlation data P20 thereof in the encoding unit 14. Then, from the partial time-series data set W20 and the correlation data P20 thereof, the encoding unit 14 generates coded data B2 consisting of a binary vector with use of the correlation destruction model stored in the model storage unit 17 (step S34).

Then, the time-series data processing device 10 searches the coded data storage unit 18 for data identical to the newly generated coded data B2 (step S35). Then, as a result of the search, when coded data identical to the newly generated coded data B2 exists in the coded data storage unit 18 (Yes at step S36), the time-series data processing device 10 reads event information associated with the coded data stored in the coded data storage unit 18, and specifies the event (step S37). The time-series data processing device 10 outputs the specified event information to the surveillant.

As described above, in the present invention, coded data is generated on the basis of the time-series data of a partial time-series data set and the correlation data. Therefore, it is possible to specify past coded data to which the state of the monitoring object conforms, from coded data generated from newly measured time-series data, whereby it is possible to specify the state of the monitoring object at a high speed with accuracy.

Second Exemplary Embodiment

Figure 15:
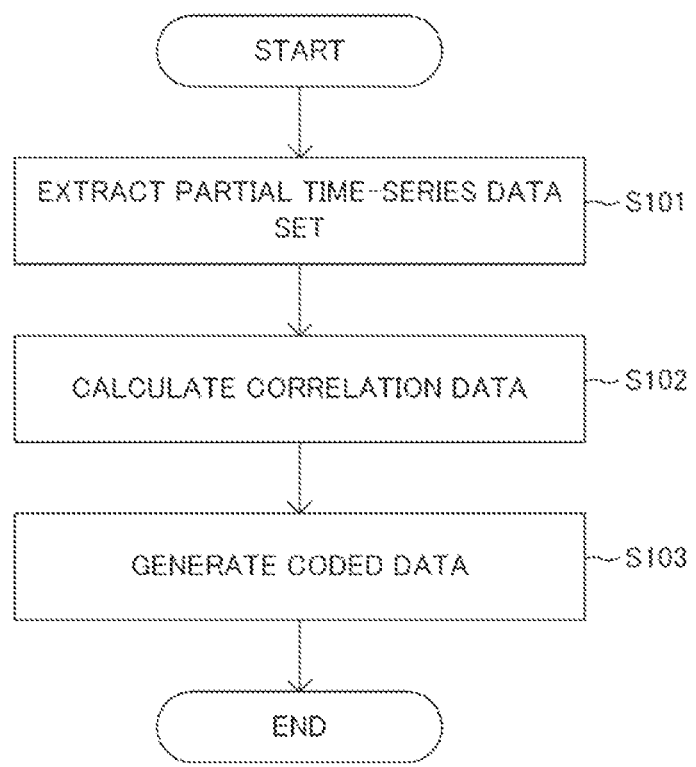
FIG. 15 is a flowchart illustrating an operation of the time-series data processing device according to the second exemplary embodiment of the present invention.

Next, a second exemplary embodiment of the present invention will be described with reference to FIGS. 13 to 19. FIGS. 13, 14, 16, and 18 are block diagrams illustrating a configuration of a time-series data processing device of the second exemplary embodiment, and FIGS. 15, 17, and 19 are flowcharts illustrating an operation of the time-series data processing device. Note that the present embodiment shows the outlines of the time-series data processing device and the time-series data processing method described in the first exemplary embodiment.

First, a hardware configuration of the time-series data processing device 100 in the present embodiment will be described with reference to FIG. 13. The time-series data processing device 100 is configured of a typical information processing device, having a hardware configured as described below as an example Central Processing Unit (CPU) 101 (arithmetic unit)
    Read Only Memory (ROM) 102 (storage unit)
    Random Access Memory (RAM) 103 (storage unit)
    Program group 104 to be downloaded to the RAM 103
    Storage device 105 storing therein the program group 104
    Drive 106 that performs reading and writing on a storage medium 110 outside the information processing device
    Communication interface 107 connecting to a communication network 111 outside the information processing device
    Input/output interface 108 for performing input/output of data
    Bus 109 connecting the constituent elements The time-series data processing device 100 can construct and being equipped with the analysis unit 121 and the encoding unit 122 illustrated in FIG. 14 through acquisition and execution of the program group 104 by the CPU 101. Note that the program group 104 is stored in the storage device 105 or the ROM 102 in advance, and is loaded to the RAM 103 by the CPU 101 as needed. Further, the program group 104 may be provided to the CPU 101 via the communication network 111, or may be stored on a storage medium 110 in advance and read out by the drive 106 and supplied to the CPU 101. However, the analysis unit 121 and the encoding unit 122 may be constructed by electronic circuits.

Figure 13:
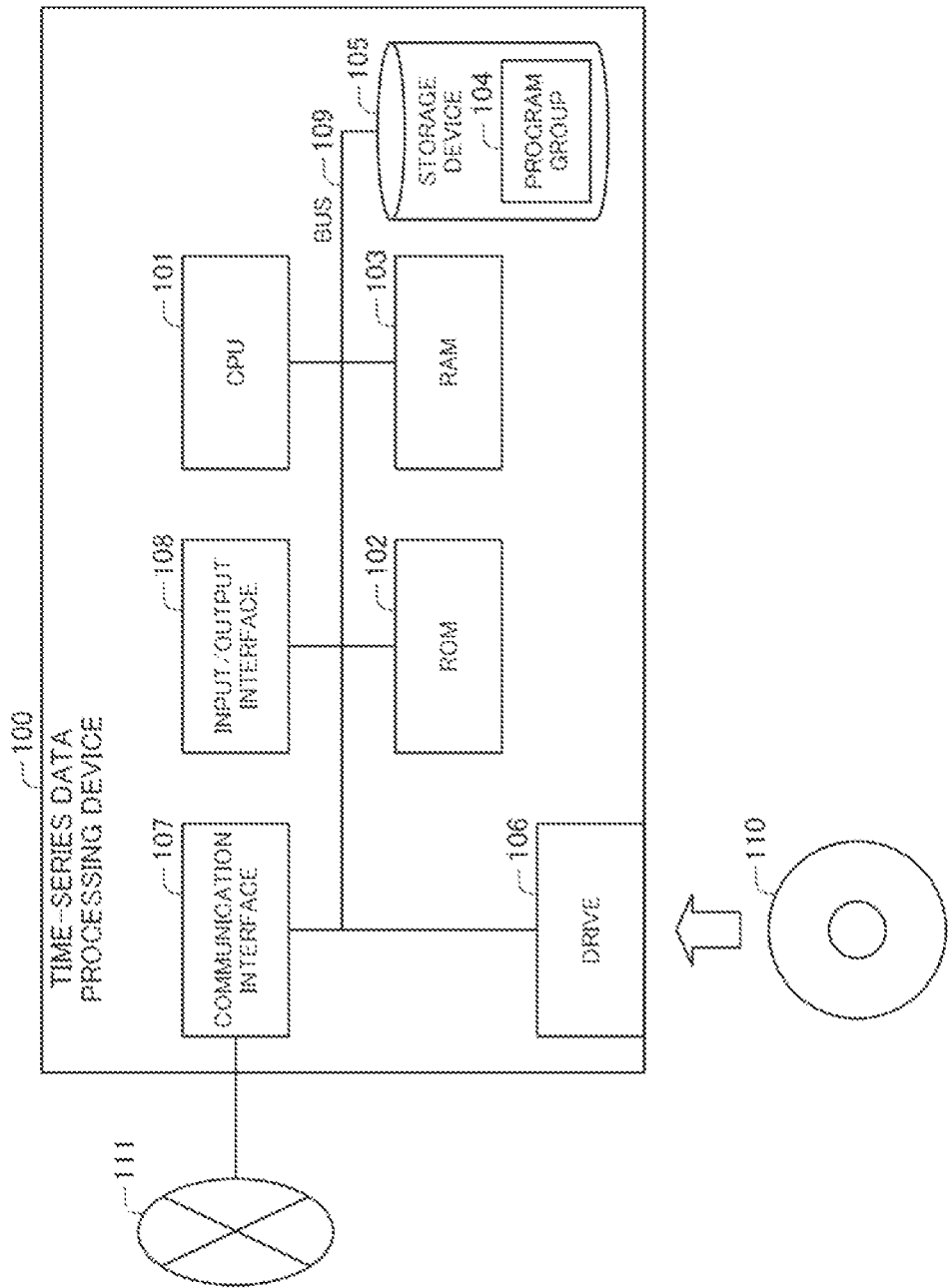
FIG. 13 is a block diagram illustrating a hardware configuration of a time-series data processing device according to a second exemplary embodiment of the present invention.
Figure 14:
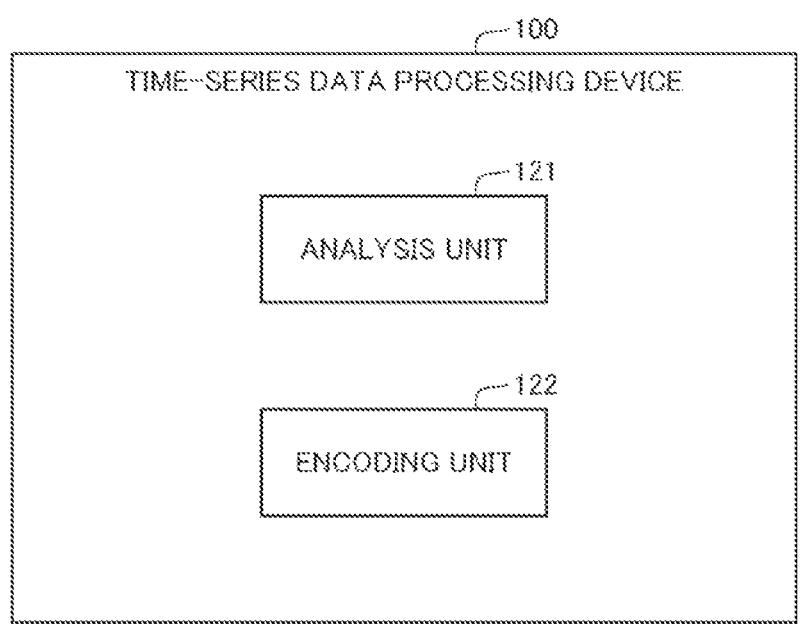
FIG. 14 is a block diagram illustrating a configuration of the time-series data processing device according to the second exemplary embodiment of the present invention.

Note that FIG. 13 illustrates an example of a hardware configuration of the information processing device that is the time-series data processing device 100. The hardware configuration of the information processing device is not limited to that described above. For example, the information processing device may be configured of part of the configuration described above, such as without the drive 106.

Then, the time-series data processing device 100 executes the time-series data processing method illustrated in the flowchart of FIG. 15, by the functions of the analysis unit 121 and the encoding unit 122 constructed by the program as described above.

As illustrated in FIG. 15, the time-series data processing device 100 extracts a partial time-series data set obtained by dividing a time-series data set that is a set of time-series data including a plurality of elements, at a predetermined time interval (step S101), calculates correlation data representing a correlation between elements of the time-series data included in the partial time-series data set (step S102), and generates coded data based on the time-series data of the partial time-series data set and the correlation data (step S103).

As described above, in the present invention, coded data is generated on the basis of time-series data of a partial time-series data set and correlation data. Therefore, it is possible to specify past coded data to which the state of the monitoring object conforms, from coded data generated from newly measured time-series data, whereby it is possible to specify the state of the monitoring object at a high speed with accuracy.

Figure 16:
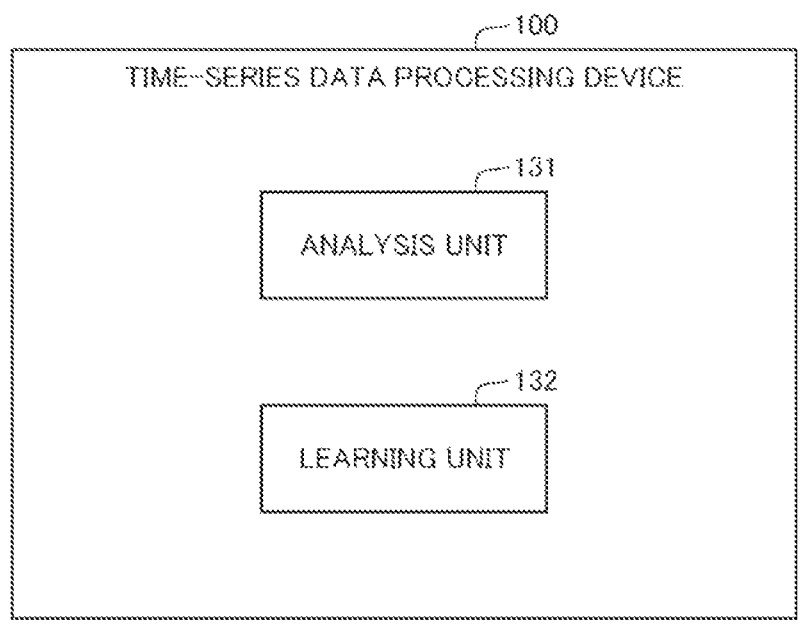
FIG. 16 is a block diagram illustrating a configuration of the time-series data processing device according to the second exemplary embodiment of the present invention.
Figure 17:
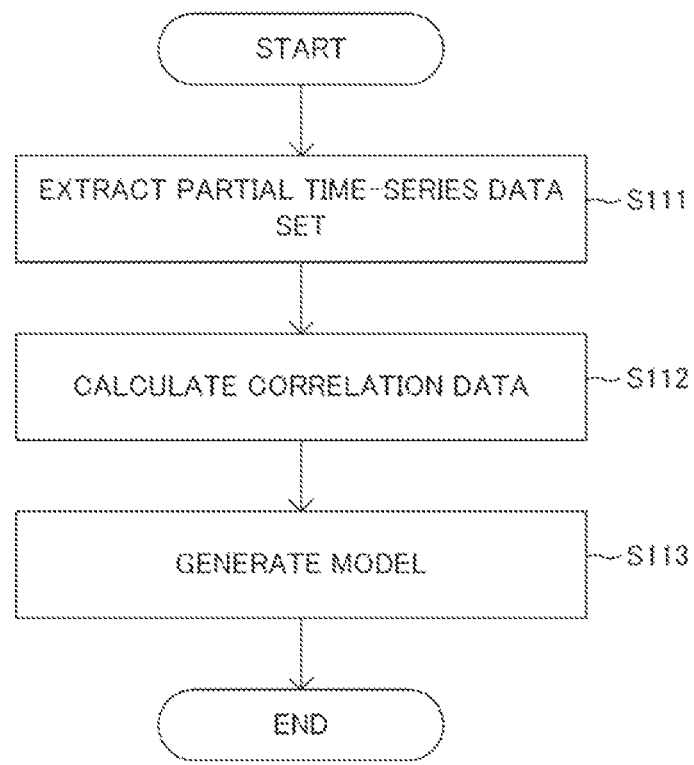
FIG. 17 is a flowchart illustrating an operation of the time-series data processing device according to the second exemplary embodiment of the present invention.

Further, the time-series data processing device 100 can construct and being equipped with the analysis unit 131 and the learning unit 132 illustrated in FIG. 16 through acquisition and execution of the program group 104 by the CPU 101. Then, the time-series data processing device 100 executes the time-series data processing method illustrated in the flowchart of FIG. 17, by the functions of the analysis unit 131 and the learning unit 132 constructed by the program as described above.

As illustrated in FIG. 17, the time-series data processing device 100 extracts a plurality of partial time-series data sets obtained by dividing a time-series data set that is a set of time-series data including a plurality of elements, at predetermined time intervals (step S111), from each of the plurality of partial time-series data sets, calculates correlation data representing a correlation between elements of the time-series data included in the partial time-series data set (step S112), and according to a difference in the time-series data and a difference in the correlation data between two of the partial time-series data sets, generates a model that has learned to generate coded data based on the time-series data of the partial time-series data set and the correlation data (step S113).

As described above, in the present invention, coded data is generated on the basis of time-series data of a new partial time-series data set and correlation data, with use of a model that has learned to generate coded data based on the difference in the time-series data of the partial time-series data set and the difference in the correlation data. Therefore, it is possible to specify the state of the monitoring object at a high speed with accuracy from the coded data generated from the newly measured time-series data, by referring to the past coded data.

Figure 18:
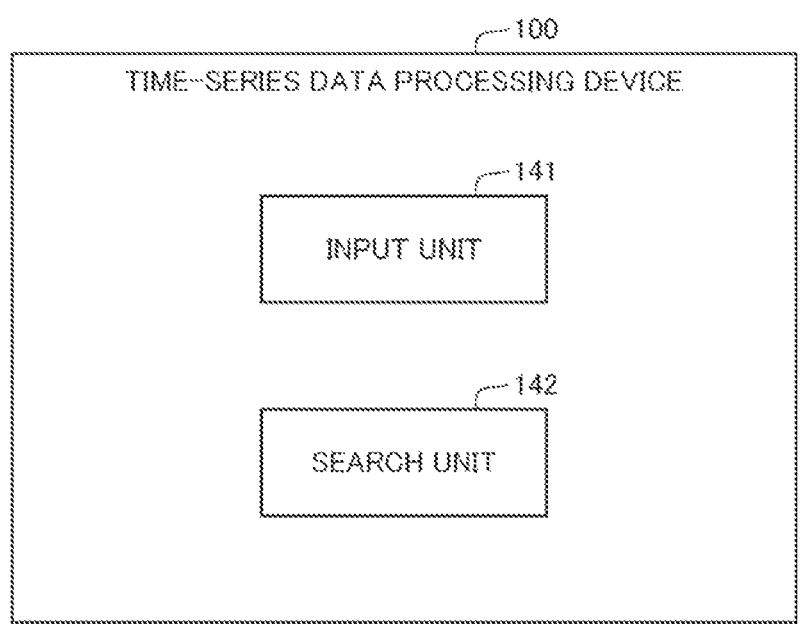
FIG. 18 is a block diagram illustrating a configuration of the time-series data processing device according to the second exemplary embodiment of the present invention.
Figure 19:
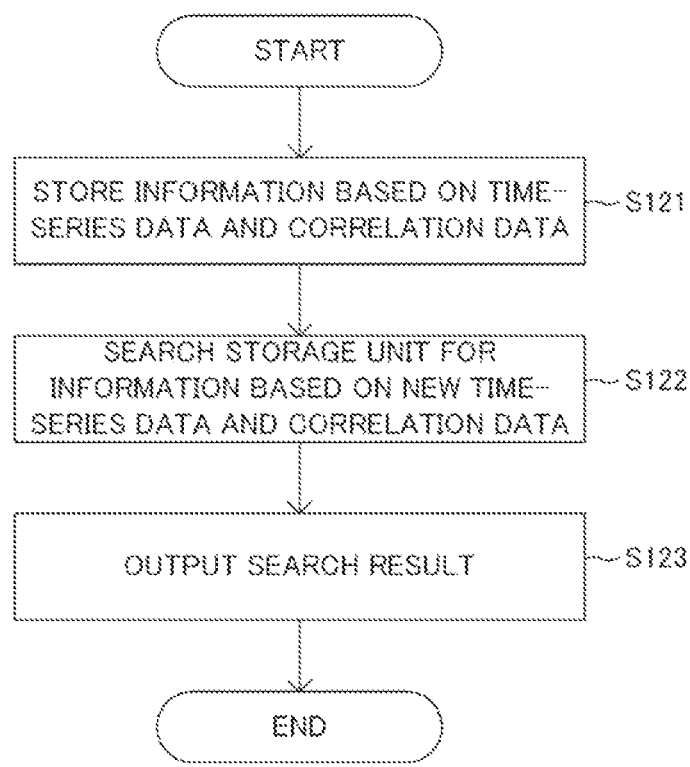
FIG. 19 is a flowchart illustrating an operation of the time-series data processing device according to the second exemplary embodiment of the present invention.

Further, the time-series data processing device 100 can construct and being equipped with the input unit 141 and the search unit 142 illustrated in FIG. 18 through acquisition and execution of the program group 104 by the CPU 101. Then, the time-series data processing device 100 executes the time-series data processing method illustrated in the flowchart of FIG. 19, by the functions of the input unit 141 and the search unit 142 constructed by the program as described above.

As illustrated in FIG. 19, the time-series data processing device 100 receives input of the time-series data of a partial time-series data set obtained by dividing a time-series data set that is a set of time-series data including a plurality of elements at given time intervals, and correlation data between elements of the time-series data, and stores information based on the time-series data and the correlation data in a storage unit (step S121), searches the storage unit for information corresponding to the time-series data and the correlation data of the partial time-series data set in the newly input time-series data set (step S122), and outputs a search result (step S123).

As described above, in the present invention, information based on time-series data and correlation data of a partial time-series data set is stored in the storage unit, and information based on time-series data and correlation data of a newly measured partial time-series data set is searched from the storage unit. Therefore, it is possible to specify the state of the monitoring object at a high speed with accuracy by referring to the information based on the past time-series data and correlation data from the information based on newly measured time-series data and correlation data.

<Supplementary Notes>

The whole or part of the exemplary embodiments disclosed above can be described as, but not limited to, the following supplementary notes. Hereinafter, outlines of the configurations of a time-series data processing method, a time-series data processing device, and a program, according to the present invention, will be described. However, the present invention is not limited to the configurations described below.

(Supplementary Note 1) A time-series data processing method comprising:

extracting a partial time-series data set obtained by dividing a time-series data set at a given time interval, the time-series data set being a set of time-series data including a plurality of elements;

calculating correlation data representing a correlation between elements of the time-series data included in the partial time-series data set; and generating coded data based on the time-series data of the partial time-series data set and the correlation data.

(Supplementary Note 2)

The time-series data processing method according to supplementary note 1, further comprising generating the coded data representing features of the time-series data of the partial time-series data set and the correlation data.

(Supplementary Note 3)

The time-series data processing method according to supplementary note 1 or 2, further comprising with use of a model generated on a basis of the time-series data of the partial time-series data set extracted from the time-series data set measured in past and the correlation data, generating the coded data of the time-series data of the partial time-series data set and the correlation data.

(Supplementary Note 4)

The time-series data processing method according to supplementary note 3, further comprising:

generating the model that learned to generate the coded data according to a difference in the time-series data and a difference in the correlation data between the partial time-series data sets that are different from each other; and with use of the model, generating the coded data of the time-series data of the partial time-series data set extracted from the time-series data set that is measured thereafter and the correlation data.

(Supplementary Note 5)

The time-series data processing method according to supplementary note 4, further comprising generating the model that learned to generate the coded data according to a difference between pieces of the time-series data and a difference between pieces of the correlation data between two of the partial time-series data sets that are different from each other.

(Supplementary Note 6)

The time-series data processing method according to any of supplementary notes 1 to 5, further comprising generating the coded data based on the time-series data of the partial time-series data set and the correlation data in which a correlation between elements of the time-series data is determined to be destructed according to a preset reference.

(Supplementary Note 7)

The time-series data processing method according to any of supplementary notes 3 to 5, further comprising:

generating the model that learned to generate the coded data on a basis of the time-series data of the partial time-series data set extracted from the time-series data set measured in past, and the correlation data in which a correlation between elements of the time-series data is determined to be destructed according to a preset reference; and with use of the model, generating the coded data based on the time-series data of the partial time-series data set extracted from the time-series data set measured thereafter, and the correlation data in which a correlation between elements of the time-series data is determined to be destructed according to a preset reference.

(Supplementary Note 8)

The time-series data processing method according to any of supplementary notes 1 to 7, further comprising:

registering the generated coded data with a storage unit; and generating the coded data on a basis of the partial time-series data set extracted from the time-series data set that is newly measured, and searching a storage unit for the coded data.

(Supplementary Note 9)

A time-series data processing method comprising:

extracting a plurality of partial time-series data sets obtained by dividing a time-series data set at a given time interval, the time-series data set being a set of time-series data including a plurality of elements;

from each of the plurality of partial time-series data sets, calculating correlation data representing a correlation between elements of the time-series data included in the partial time-series data set; and according to a difference in the time-series data and a difference in the correlation data between the partial time-series data sets that are different from each other, generating a model that learned to generate coded data based on the time-series data of the partial time-series data set and the correlation data.

(Supplementary Note 10)

The time-series data processing method according to supplementary note 9, further comprising generating the model that learned to generate the coded data according to a difference between pieces of the time-series data and a difference between pieces of the correlation data between two of the partial time-series data sets that are different from each other.

(Supplementary Note 11)

The time-series data processing method according to supplementary note 9 or 10, further comprising generating the model that learned to generate the coded data on a basis of the time-series data of the partial time-series data set extracted from the time-series data set measured in past, and the correlation data in which a correlation between elements of the time-series data is determined to be destructed according to a preset reference.

(Supplementary Note 12)

A time-series data processing method comprising:

receiving input of time-series data of a partial time-series data set obtained by dividing a time-series data set at a given time interval, the partial time-series data set being a set of time-series data including a plurality of elements, and correlation data between elements of the time-series data, and storing information based on the time-series data and the correlation data in a storage unit;

searching the storage unit for information corresponding to the time-series data of the partial time-series data set in the time-series data set that is newly input and the correlation data; and outputting a search result.

(Supplementary Note 13)

A program for causing an information processing device to perform processing of:

extracting a partial time-series data set obtained by dividing a time-series data set at a given time interval, the time-series data set being a set of time-series data including a plurality of elements;

calculating correlation data representing a correlation between elements of the time-series data included in the partial time-series data set; and generating coded data based on the time-series data of the partial time-series data set and the correlation data.

(Supplementary Note 14)

A program for causing an information processing device to perform processing of: extracting a plurality of partial time-series data sets obtained by dividing a time-series data set at a given time interval, the time-series data set being a set of time-series data including a plurality of elements;

from each of the plurality of partial time-series data sets, calculating correlation data representing a correlation between elements of the time-series data included in the partial time-series data set; and according to a difference in the time-series data and a difference in the correlation data between the partial time-series data sets that are different from each other, generating a model that learned to generate coded data based on the time-series data of the partial time-series data set and the correlation data.

(Supplementary Note 15)

A program causing an information processing device to perform processing of:

receiving input of time-series data of a partial time-series data set obtained by dividing a time-series data set at a given time interval, the partial time-series data set being a set of time-series data including a plurality of elements, and correlation data between elements of the time-series data, and storing information based on the time-series data and the correlation data in a storage unit;

searching the storage unit for information corresponding to the time-series data of the partial time-series data set in the time-series data set that is newly input and the correlation data; and outputting a search result.

(Supplementary Note 16)

A time-series data processing device comprising:

an analysis unit that extracts a partial time-series data set obtained by dividing a time-series data set at a given time interval, the time-series data set being a set of time-series data including a plurality of elements, and calculates correlation data representing a correlation between elements of the time-series data included in the partial time-series data set; and an encoding unit that generates coded data based on the time-series data of the partial time-series data set and the correlation data.

(Supplementary Note 16.1)

The time-series data processing device according to supplementary note 16, wherein the encoding unit generates the coded data representing features of the time-series data of the partial time-series data set and the correlation data.

(Supplementary Note 16.2)

The time-series data processing device according to supplementary note 16 or 16.1, wherein with use of a model generated based on the time-series data of the partial time-series data set extracted from the time-series data set measured in past and the correlation data, the encoding unit generates the coded data of the time-series data of the partial time-series data set and the correlation data.

(Supplementary Note 17)

The time-series data processing device according to supplementary note 16, further comprising a learning unit that generates a model that learned to generate the coded data according to a difference in the time-series data and a difference in the correlation data between different partial time-series data sets of the time-series data set measured in past, wherein with use of the model, the encoding unit generates the coded data of the time-series data of the partial time-series data set extracted from the time-series data set that is measured thereafter and the correlation data.

(Supplementary note 17.1)

The time-series data processing device according to supplementary note 17, wherein the learning unit generates the model that learned to generate the coded data according to a difference between pieces of the time-series data and a difference between pieces of the correlation data between two of the partial time-series data sets that are different from each other.

(Supplementary note 17.2)

The time-series data processing device according to supplementary note 16 or 17, wherein the encoding unit generates the coded data based on the time-series data of the partial time-series data set and the correlation data in which a correlation between elements of the time-series data is determined to be destructed according to a preset reference.

(Supplementary note 17.3)

The time-series data processing device according to supplementary note 17, wherein the learning unit generates the model that learned to generate the coded data on a basis of the time-series data of the partial time-series data set extracted from the time-series data set measured in past, and the correlation data in which a correlation between elements of the time-series data is determined to be destructed according to a preset reference, and with use of the model, the encoding unit generates the coded data based on the time-series data of the partial time-series data set extracted from the time-series data set measured thereafter, and the correlation data in which a correlation between elements of the time-series data is determined to be destructed according to a preset reference.

(Supplementary Note 18)

The time-series data processing device according to supplementary note 16 or 17, wherein the encoding unit registers the generated coded data with a storage unit, and the time-series data processing device further comprises a search unit that searches the storage unit for the coded data generated based on the partial time-series data set extracted from the time-series data set that is newly measured.

(Supplementary Note 19)

A time-series data processing device comprising:

an analysis unit that extracts a plurality of partial time-series data sets obtained by dividing a time-series data set at a given time interval, the time-series data set being a set of time-series data including a plurality of elements, and from each of the plurality of partial time-series data sets, calculates correlation data representing a correlation between elements of the time-series data included in the partial time-series data set; and a learning unit that, according to a difference in the time-series data and a difference in the correlation data between the partial time-series data sets that are different from each other, generates a model that learned to generate coded data based on the time-series data of the partial time-series data set and the correlation data.

(Supplementary Note 19.1)

The time-series data processing device according to supplementary note 19, wherein the learning unit generates the model that learned to generate the coded data according to a difference between pieces of the time-series data and a difference between pieces of the correlation data between two of the partial time-series data sets that are different from each other.

(Supplementary Note 19.2)

The time-series data processing device according to supplementary note 19, wherein the learning unit generates the model that learned to generate the coded data on a basis of the time-series data of the partial time-series data set extracted from the time-series data set measured in past, and the correlation data in which a correlation between elements of the time-series data is determined to be destructed according to a preset reference.

(Supplementary Note 20)

A time-series data processing device comprising:

an input unit that receives input of time-series data of a partial time-series data set obtained by dividing a time-series data set at a given time interval, the partial time-series data set being a set of time-series data including a plurality of elements, and correlation data between elements of the time-series data, and stores information based on the time-series data and the correlation data in a storage unit; and a search unit that searches the storage unit for information corresponding to the time-series data of the partial time-series data set in the time-series data set that is newly input and the correlation data, and outputs a search result.

Note that the program described above can be supplied to a computer by being stored on a non-transitory computer readable medium of any type. Non-transitory computer readable media include tangible storage media of various types. Examples of non-transitory computer readable media include a magnetic recording medium (for example, flexible disk, magnetic tape, hard disk drive), a magneto-optical recording medium (for example, magneto-optical disk), a CD-ROM (Read Only Memory). a CD-R, a CD-R/W, a semiconductor memory (for example, mask ROM, PROM (Programmable ROM), and EPROM (Erasable PROM), a flash ROM, and a RAM (Random Access Memory). The program described above may also be supplied to a computer by being stored on a transitory computer readable medium of any type. Examples of transitory computer readable media include electric signals, optical signals, and electromagnetic waves. A transitory computer readable medium can be supplied to a computer via a wired communication channel such as an electric wire and an optical fiber, or a wireless communication channel.

While the present invention has been described with reference to the exemplary embodiments described above, the present invention is not limited to the above-described embodiments. The form and details of the present invention can be changed within the scope of the present invention in various manners that can be understood by those skilled in the art.

REFERENCE SIGNS LIST

10 time-series data processing device
11 measurement unit
12 learning unit
13 analysis unit
14 encoding unit
15 search unit
16 measurement data storage unit
17 model storage unit
18 coded data storage unit
21 correlation model learning unit
22 correlation destruction model learning unit
31 section extraction unit
32 correlation destruction detection unit
100 time-series data processing device
121 analysis unit
122 encoding unit
131 analysis unit
132 learning unit
141 input unit
142 search unit

What is claimed is:

1. A time-series data processing method comprising:

measuring a time-series data set including a set of time-series data corresponding to a plurality of elements of a monitoring object;

extracting a partial time-series data set by dividing the time-series data set at a same time interval;

calculating correlation data representing a correlation between an input value of one element and an output value of another element of any two elements of the time-series data included in the partial time-series data set;

generating coded data, represented by a binary vector, according to a distance between pieces of the time-series data and a distance between pieces of the correlation data between two of the partial time-series data sets that are different from each other;

registering the generated coded data with a storage;

generating additional coded data on a basis of a partial time-series data set extracted from the time-series data set that is newly measured;

searching the storage based on the additional coded data; and outputting a result of the search to indicate a state of the object with high speed and accuracy.

2. The time-series data processing method according to claim 1, further comprising
generating the coded data representing features of the time-series data of the partial time-series data set and the correlation data.

3. The time-series data processing method according to claim 1, further comprising
with use of a model generated on a basis of the time-series data of the partial time-series data set extracted from the time-series data set measured in past and the correlation data, generating the coded data of the time-series data of the partial time-series data set and the correlation data.

4. The time-series data processing method according to claim 3, further comprising:
generating the model learned to generate the coded data according to a difference in the time-series data and a difference in the correlation data between the partial time-series data sets that are different from each other; and
with use of the model, generating the coded data of the time-series data of the partial time-series data set extracted from the time-series data set that is measured thereafter and the correlation data.

5. The time-series data processing method according to claim 4, further comprising
generating the model that learned to generate the coded data according to a difference between pieces of the time-series data and a difference between pieces of the correlation data between two of the partial time-series data sets that are different from each other.

6. The time-series data processing method according to claim 3, further comprising:
generating the model that learned to generate the coded data on a basis of the time-series data of the partial time-series data set extracted from the time-series data set measured in past, and the correlation data in which a correlation between elements of the time-series data is determined to be destructed according to a preset reference; and
with use of the model, generating the coded data based on the time-series data of the partial time-series data set extracted from the time-series data set measured thereafter, and the correlation data in which a correlation between elements of the time-series data is determined to be destructed according to a preset reference.

7. The time-series data processing method according to claim 1, further comprising
generating the coded data based on the time-series data of the partial time-series data set and the correlation data in which a correlation between elements of the time-series data is determined to be destructed according to a preset reference.

8. A time-series data processing method comprising:
measuring a time-series data set including a set of time-series data corresponding to a plurality of elements of a monitoring object;
extracting a plurality of partial time-series data sets by dividing the time-series data set at a same time interval;
from each of the plurality of partial time-series data sets, calculating correlation data representing a correlation between an input value of one element and an output value of another element of any two elements of the time-series data included in the partial time-series data set;
according to a difference between pieces of the time-series data and a difference between pieces of the correlation data between two of the partial time-series data sets that are different from each other partial time-series data sets that are different from each other, generating a model learned to generate coded data;
generating coded data using the model;
registering the generated coded data with a storage;
generating additional coded data on a basis of a partial time-series data set extracted from the time-series data set that is newly measured;
searching the storage based on the additional coded data; and
outputting a result of the search to indicate a state of the object with high speed and accuracy.

9. The time-series data processing method according to claim 8, further comprising
generating the model that learned to generate the coded data on a basis of the time-series data of the partial time-series data set extracted from the time-series data set measured in past, and the correlation data in which a correlation between elements of the time-series data is determined to be destructed according to a preset reference.

* * * * *